US007401211B2

United States Patent
Kottapalli et al.

(10) Patent No.: US 7,401,211 B2
(45) Date of Patent: Jul. 15, 2008

(54) METHOD FOR CONVERTING PIPELINE STALLS CAUSED BY INSTRUCTIONS WITH LONG LATENCY MEMORY ACCESSES TO PIPELINE FLUSHES IN A MULTITHREADED PROCESSOR

(75) Inventors: Sailesh Kottapalli, Milpitas, CA (US); Udo Walterscheidt, San Jose, CA (US)

(73) Assignee: Intel Corporation, Santa Clara, CA (US)

( * ) Notice: Subject to any disclaimer, the term of this patent is extended or adjusted under 35 U.S.C. 154(b) by 868 days.

(21) Appl. No.: 09/751,762

(22) Filed: Dec. 29, 2000

(65) Prior Publication Data

US 2002/0087840 A1 Jul. 4, 2002

(51) Int. Cl.
*G06F 9/48* (2006.01)
*G06F 9/312* (2006.01)

(52) U.S. Cl. .................. 712/245; 712/219; 712/227; 712/244

(58) Field of Classification Search .................. 712/219, 712/228, 227, 245, 244
See application file for complete search history.

(56) References Cited

U.S. PATENT DOCUMENTS

| 5,361,337 | A  | * | 11/1994 | Okin .......................... 712/228 |
| 5,553,305 | A  | * | 9/1996 | Gregor et al. ................ 718/106 |
| 5,890,008 | A  | * | 3/1999 | Panwar et al. .................. 712/15 |
| 5,933,627 | A  | * | 8/1999 | Parady ........................ 712/228 |
| 6,016,542 | A  | * | 1/2000 | Gottlieb et al. ............. 712/225 |
| 6,694,425 | B1 | * | 2/2004 | Eickemeyer ................ 712/216 |

OTHER PUBLICATIONS

Computer Organization and Design—The Hardware/Software Interface, John L. Hennessy and David A. Patterson, Morgan Kaugmann Publishers, 2nd Edition, 1998, p. 505.*

* cited by examiner

*Primary Examiner*—Daniel Pan
(74) *Attorney, Agent, or Firm*—Kenyon & Kenyon LLP

(57) ABSTRACT

In a multi-threaded processor, a long latency data dependent thread is flushed from the execution pipelines. Once the stalled thread is flushed, the non-stalling threads in the pipeline can continue their execution. Several resources are used to reduce this unwanted impact of stalls on the non-stalling threads. Also, these resources ensure that the earlier stalled thread, now flushed, is re-executed when the data dependency is resolved.

11 Claims, 2 Drawing Sheets

METHOD FOR CONVERTING PIPELINE STALLS CAUSED BY INSTRUCTIONS WITH LONG LATENCY MEMORY ACCESSES TO PIPELINE FLUSHES IN A MULTITHREADED PROCESSOR

BACKGROUND OF THE INVENTION

The present invention pertains to a method and apparatus for converting pipeline stalls to pipeline flushes in a processor. More particularly, the present invention pertains to flushing and tracking a stalled thread in the pipeline to allow forward progress of all non-stalling threads in a multi-threaded processor.

As is known in the art, a processor includes a variety of sub-modules, each adapted to carry out specific tasks. In one known processor, these sub-modules include the following: an instruction cache; an instruction fetch unit for fetching appropriate instructions from the instruction cache; an instruction buffer that holds the fetched instructions from the instruction cache; a scheduler that schedules the dispersal of individual instructions into separate execution pipes; execution pipes that execute the individual instructions; a pipeline control logic that monitors the activity within the execution pipes; and exception and retirement logic that checks for illegal operations and retires the exception-free instructions in program order.

Programming code to be executed by the processor can sometimes be broken down into smaller components referred to as "threads." A thread is a series of instructions whose execution achieves a given task. For example, in a video phone applications, the processor may be called upon to execute code to handle video image data as well as audio data. There may be separate code sequences whose execution is designed to handle each of these data types. Thus, a first thread may include instructions for video image data processing and a second thread may include instructions for audio data processing.

As is known in the art, simultaneous multi-threaded ("SMT") processors enable multiple threads to be active simultaneously within a single processor core. SMT implementations allow the machine width to be optimally occupied by filling up the execution pipes with instructions from multiple threads. By definition, instructions from different threads exhibit no dependency, which enables parallel execution. During parallel execution, operation and data dependencies are handled by stalling the pipeline given the in-order nature of the processor. These stalls span from a single cycle, to address some execution latencies, to several hundreds of clock cycles in cases involving data fetches from external memories (i.e. data from the off-chip memory). Thus, thread-specific stalls with long latencies of several hundred clock cycles could result in a significant decrease in the performance of a processor.

Another shortcoming to the thread-specific stalls is the under-utilization of the multi-threaded execution pipelines. As instructions from multiple threads are interspersed amongst the execution pipes, stalling one thread results in blocking all pipes. Although the non-stalling threads can make progress, it cannot be issued to the ports of the stalled thread. As a result, the stalls have an added performance drawback for multi-threaded processors since a stalled thread effectively stalls the progress on the other non-stalling threads.

In view of the above, there is a need for an improved method and system to handle pipeline stalls in a multi-threaded processor.

DETAILED DESCRIPTION OF THE DRAWINGS

Figure 1:
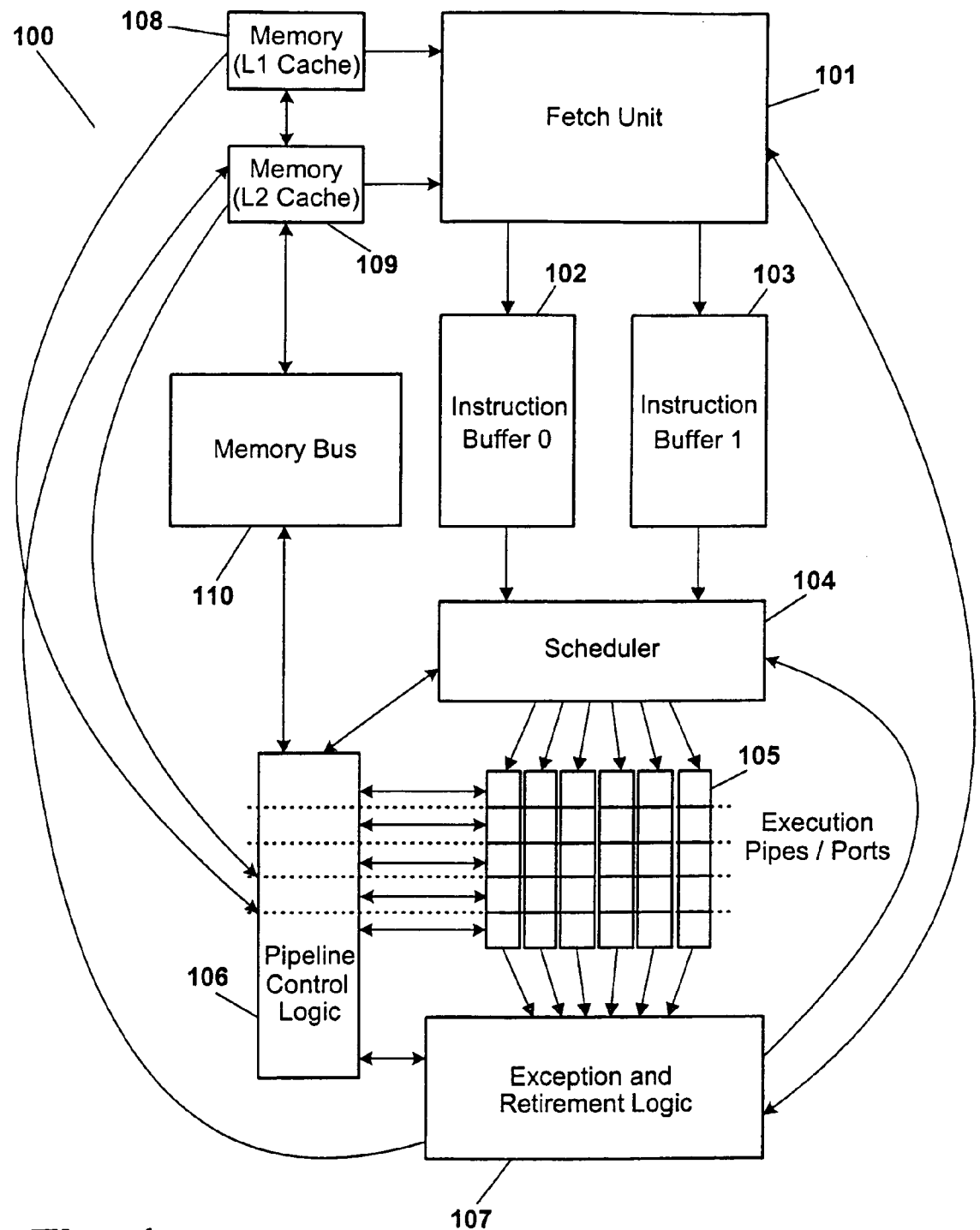
FIG. 1 is a block diagram of a portion of a multi-threaded processor employing an embodiment of the present invention.

Referring to FIG. 1, a block diagram of a processor system 100 (e.g. a microprocessor, a digital signal processor, or the like) operated according to an embodiment of the present invention is shown. In this embodiment, the processor is a multi-threaded processor where the execution is theoretically divided into two or more logical processors. As used herein, the term "thread" refers to an independent instruction code sequence. In this example, there are one or more execution units (i.e., multiple execution pipes 105), which may execute one or more instructions at a time. The processor system 100, however may be treated as two logical processors, a first logical processor executing instructions from the first thread (Thread 0) and a second logical processor executing instructions from the second thread (Thread 1).

In this embodiment of the processor system 100, instructions are fetched by a fetch unit 101 from memory (i.e., either from L1 cache memory 108 or from L2 memory cache 109). The instructions are then supplied to the instruction buffers, thread 0 in instruction buffer 0 (i.e., instruction buffer 102) and thread 1 in instruction buffer 1 (i.e., instruction buffer 103). The instruction buffers supply its outputs to the scheduler 104. The scheduler controls when and in what order the instructions from thread 0 or thread 1 are supplied to the execution ports 105. The pipeline control logic 106 monitors the execution of the threads and tracks the return of data from L1 memory cache 108 or L2 memory cache 109 or memory bus 110 as needed. The outputs of the execution pipes 105 are then supplied to the exception and retirement unit 107.

According to this embodiment of the present invention, a "stall-miss-flush" approach is used to flush and track a stalled thread from the execution pipes. In FIG. 1, in this example, during execution in one of the execution pipes 105, a data dependent operation or instruction in thread 0, stalls. As used herein, a data dependent operation is one where, in order to perform a particular instruction of a thread, data needs to be loaded from memory (e.g., L1 cache 108, L2 cache 109, etc.). The pipeline control logic 106, in monitoring stalled thread 0, first attempts to retrieve the data from L1 memory cache 108, a delay of a few clock cycles. If the data is not found in the L1 memory cache 108, the pipeline control logic 106 attempts to retrieve the data from the L2 memory cache 109, which takes an additional number of clock cycles, approximately 5 to 10 cycles in this embodiment of the processor system 100. At the same time, stalled thread 0 blocks the pipeline for non-stalling thread 1 that follows in the execution pipes 105. The pipeline control logic 106 flags the instruction of the thread as a missed search (i.e., a "miss"). The stall on thread 0 is then released and the instruction is flushed through the execution pipes 105 into the exception and retirement logic 107, which allows thread 1 to continue its execution down the pipeline. Pipeline control logic 106 continues to retrieve the data from a third level of memory (e.g., random access memory coupled to memory bus 110), which may take several hundreds of clock cycles to recover. Exception and retirement logic 107 detects that thread 0 has data dependencies that have not been completed and informs fetch unit 101 to fetch the miss instruction from thread 0 once more and attempt to execute the isntructions from thread 0 again.

This time around, when the miss instruction from thread 0 reaches scheduler 104, the scheduler 104 awaits an update pipeline control logic 106 when the data needed by thread 0 has been retrieved from the memory bus. When the data is available, the scheduler starts dispersal of this instruction from thread 0 into the execution pipes 105. This time through, thread 0 can resolve its data dependency without stalling by accessing the data made available.

Figure 2:
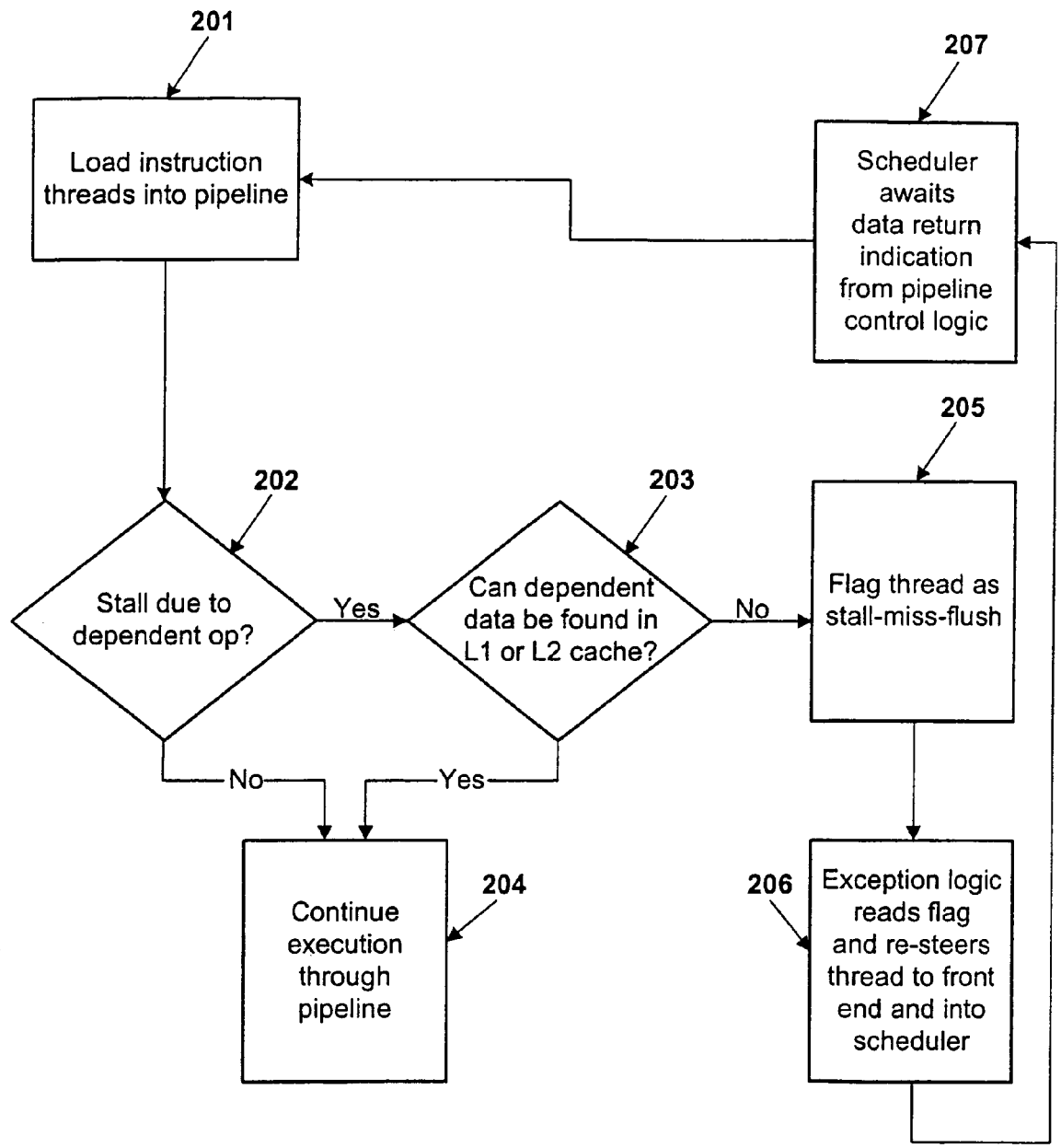
FIG. 2 is a flow diagram showing an embodiment of a method according to an embodiment of the present invention.

An example of the operation of pipeline control logic 107 in this embodiment is shown in FIG. 2. After being released by the scheduler 104, in block 201, the instruction threads are loaded into the pipeline. In decision block 202, when a thread stalls, it is determined whether the stall is due to a dependent operation needed by the thread. If it is not (e.g., to address some execution latencies), control passes to block 204 where the thread completes execution through the pipeline. If the stall is due to a dependent data operation, control passes to decision block 203 to determine if the data can be retrieved from memory either in the L1 cache or L2 cache, rather than from external memories. If it is found in the L1 cache or L2 cache, then control passes to block 204 to await return of data and continue execution through the pipeline. If it is not found in the L1 cache or L2 cache, control shifts to block 205 where the thread is flagged as a stall-miss-flush. Control then passes to block 206 where the exception and retirement logic 107 reads the flag and re-steers the thread to the front end and eventually back to the scheduler 104. The scheduler 104, in block 207, awaits a data return indication from the pipeline control logic 106 before returning control to block 201 to load the threads into the execution pipelines. Likewise, if the thread does not stall, it continues through the pipeline for execution in a normal manner. One skilled in the art will appreciate that the amount of delay that is unacceptable to cause the thread to be flagged as a stall-miss-flush may be modified (e.g., only flag the thread as such if the dependent data is not in the L1 cache alone).

As seen from the above, a stall-miss-flush approach works to keep the utilization of the processor high by decreasing the clock cycles per instruction. This is because the non-stalling threads in the pipeline can be executed even when a long latency data dependent thread precedes it in the pipeline. During the several hundreds of clock cycles needed to resolve the data dependency, instruction from other non-stalling threads can be processed for execution. When long latency stalls are flushed, overall performance of the processing system may be enhanced.

Although a single embodiment is specifically illustrated and described herein, it will be appreciated that modifications and variations of the present invention are covered by the above teachings and within the purview of the appended claims without departing from the spirit and intended scope of the invention.

What is claimed is:

1. A method comprising:
   determining if a stalled operation of a first thread is due to a loading of data from a memory device;
   flushing an instruction from said first thread from a pipeline of a processing system after a predetermined number of clock cycles if data is to be loaded from said memory device before executing said instruction;
   marking said instruction as a miss; and
   reschedulimg said instruction to be executed in said pipeline.

2. The method of claim 1 wherein said memory device is system memory coupled to a memory bus.

3. The method of claim 1 further comprising:
   executing said instruction when data is loaded from said memory device.

4. A processing system comprising:
   a scheduler to pass instructions from a first thread and a second thread to an execution pipeline;
   pipeline control logic unit coupled to said execution pipeline to determine if a stalled execution of said first thread is due to a loading of data from a memory device and to flush an instruction from said first thread from said execution pipeline after a predetermined number of clock cycles if data is to be loaded from said memory device before said instruction can be executed; and
   an exception and retirement logic unit coupled to said execution pipeline, wherein said instruction marked as a miss is to be detected by said exception and retirement logic unit.

5. The processing system of claim 4 wherein said pipeline control logic unit is to mark said instruction as a miss.

6. The processing system of claim 4 further comprising:
   a fetch unit to provide said instruction to said scheduler.

7. The processing system of claim 6 wherein said pipeline control logic unit is to cause said instruction to be executed if data is loaded from said memory device.

8. A computing system comprising:
   a memory bus coupled to system memory; and
   a processing system coupled to said memory bus, said processing system including:
   a scheduler to pass instructions from a first thread and a second thread to an execution pipeline;
   pipeline control logic unit coupled to said execution pipeline to determine if a stalled execution of said first thread is due to a loading of data from system memory and to flush an instruction from said first thread from said execution pipeline after a predetermined number of clock cycles if data is to be loaded from said system memory before said instruction can be executed; and
   an exception and retirement logic unit coupled to said execution pipeline, wherein said instruction marked as a miss is to be detected by said exception and retirement logic unit.

9. The computing system of claim 8 wherein said pipeline control logic unit is to mark said instruction as a miss.

10. The computing system of claim 8 wherein said processing system further includes
    a fetch unit to provide said instruction to said scheduler.

11. The computing system of claim 10 wherein said pipeline control logic unit is to cause said instruction to be executed when data is loaded from said system memory.

* * * * *

UNITED STATES PATENT AND TRADEMARK OFFICE
CERTIFICATE OF CORRECTION

PATENT NO. : 7,401,211 B2 Page 1 of 1
APPLICATION NO. : 09/751762
DATED : July 15, 2008
INVENTOR(S) : Sailesh Kottapalli et al.

It is certified that error appears in the above-identified patent and that said Letters Patent is hereby corrected as shown below:

Column 4, Line 6 "reschedulimg" should be --rescheduling--

Signed and Sealed this

Eighteenth Day of August, 2009

David J. Kappos
*Director of the United States Patent and Trademark Office*